United States Patent [19]
Le

[11] Patent Number: 5,350,988
[45] Date of Patent: Sep. 27, 1994

[54] DIGITAL MOTOR CONTROLLER

[75] Inventor: Dong T. Le, Lakewood, Calif.

[73] Assignee: AlliedSignal, Inc., Morris Township, Morris County, N.J.

[21] Appl. No.: 724,647

[22] Filed: Jul. 2, 1991

Related U.S. Application Data

[63] Continuation-in-part of Ser. No. 550,410, Jul. 10, 1990, abandoned.

[51] Int. Cl.$^5$ ............................ H02P 5/40; H02P 8/00
[52] U.S. Cl. .................................... 318/618; 318/811; 318/254; 318/603
[58] Field of Search ............... 318/138, 139, 254, 600, 318/599, 602, 603, 608, 661, 800–812, 616, 618, 561

[56] References Cited
U.S. PATENT DOCUMENTS

| | | | |
|---|---|---|---|
| 3,660,744 | 5/1972 | Plummer . | |
| 3,728,607 | 4/1973 | Isak ....................... | 318/608 |
| 3,795,851 | 3/1974 | Gage et al. . | |
| 3,917,930 | 11/1975 | Davey et al. . | |
| 4,131,835 | 12/1978 | Lange . | |
| 4,157,538 | 1/1979 | Simon et al. . | |
| 4,249,116 | 2/1981 | Hieda . | |
| 4,283,664 | 8/1981 | Ebert . | |
| 4,369,400 | 1/1983 | Turner et al. . | |
| 4,374,351 | 2/1983 | Fishman et al. . | |
| 4,390,865 | 6/1983 | Lauro . | |
| 4,412,163 | 10/1983 | Angerbach et al. . | |
| 4,454,458 | 6/1984 | Holland ................ | 318/254 |
| 4,459,529 | 7/1984 | Johnson ................ | 318/729 |
| 4,477,762 | 10/1984 | Kurakake et al. ..... | 318/802 |
| 4,511,827 | 4/1985 | Morinaga et al. . | |
| 4,528,486 | 7/1985 | Flaig et al. . | |
| 4,563,619 | 1/1986 | Davis et al. . | |
| 4,573,002 | 2/1986 | Kurakake et al. ..... | 318/721 |
| 4,581,569 | 4/1986 | Fujioka et al. ....... | 318/811 |
| 4,603,283 | 7/1986 | Oltendorf . | |
| 4,611,155 | 9/1986 | Kurakake ............. | 318/603 |
| 4,631,459 | 12/1986 | Fujioka et al. . | |
| 4,694,229 | 9/1987 | Cormack . | |
| 4,717,864 | 1/1988 | Fultz . | |
| 4,761,703 | 8/1988 | Kliman et al. ....... | 318/806 X |
| 4,763,057 | 8/1988 | Danz et al. .......... | 318/809 |
| 4,772,996 | 9/1988 | Hanei et al. ......... | 318/811 |
| 4,779,031 | 10/1988 | Arends et al. ....... | 318/565 |
| 4,795,958 | 1/1989 | Nakamura et al. ... | 318/625 |
| 4,843,297 | 6/1989 | Landino et al. ...... | 318/811 |
| 4,857,814 | 8/1989 | Duncan ............... | 318/281 |
| 4,882,120 | 11/1989 | Roe et al. . | |
| 4,961,038 | 10/1990 | MacMinn .............. | 318/696 |
| 4,983,895 | 1/1991 | Koharagi et al. .... | 318/254 |

*Primary Examiner*—Paul Ip
*Attorney, Agent, or Firm*—Robert A. Walsh

[57] ABSTRACT

A digital motor controller employs a digital signal processor to generate commutation commands that drive and brake a motor. The commutation commands are pulse width modulated. To avoid shoot-through, the digital signal processor automatically adjusts the widths of the pulses according to the amount of current being drawn by the motor. Motor speed is measured by taking the difference between consecutive samples from a position sensor and dividing the difference by the sampling time. The digital signal processor also closes position, speed and current loops. The commands provided by each loop are limited between upper and lower limits. Further, the digital signal processor automatically adjusts the upper and lower limits to compensate for changes in design characteristics due to variations in temperature. The digital motor controller can be used to control different motors having different design characteristics simply by reprogramming the upper and lower limits. A plurality of digital motor controllers can be used to control motors operating in tandem.

38 Claims, 11 Drawing Sheets

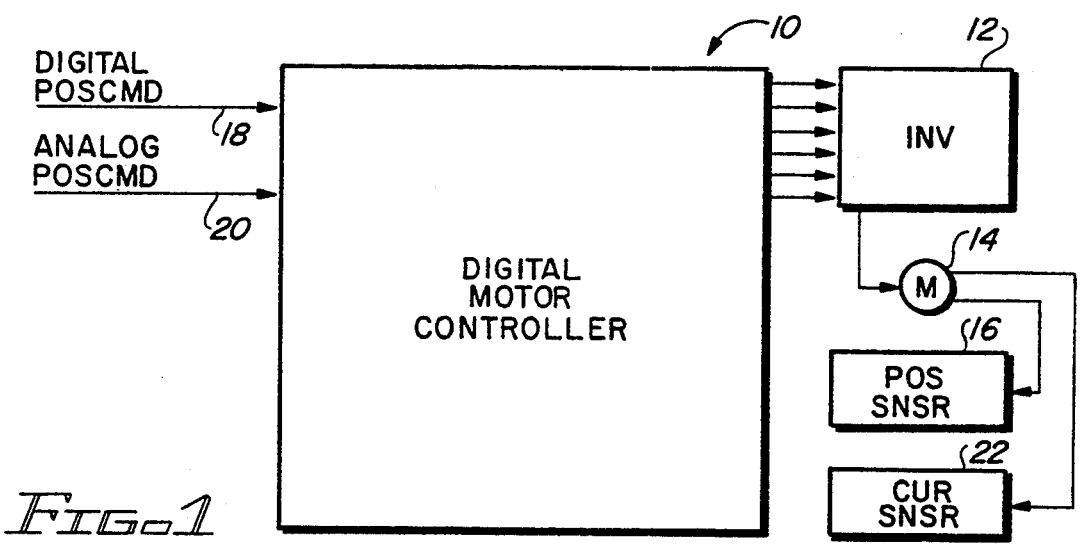
Fig. 1
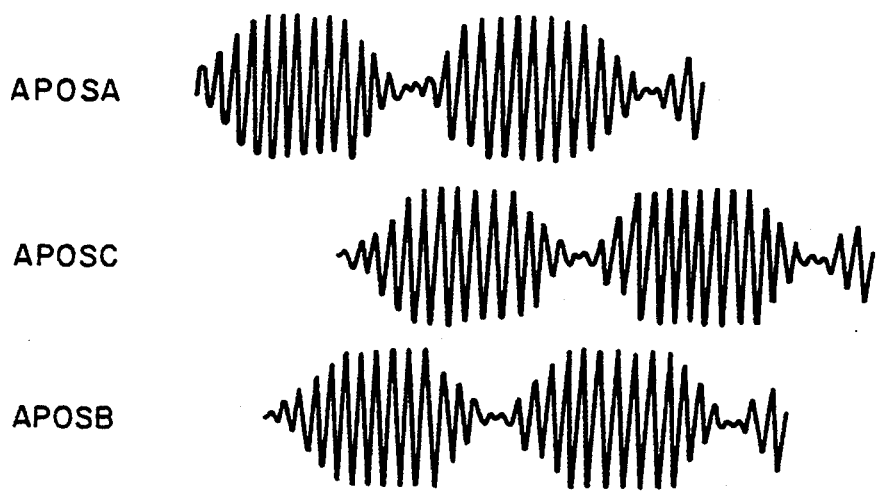
Fig. 3
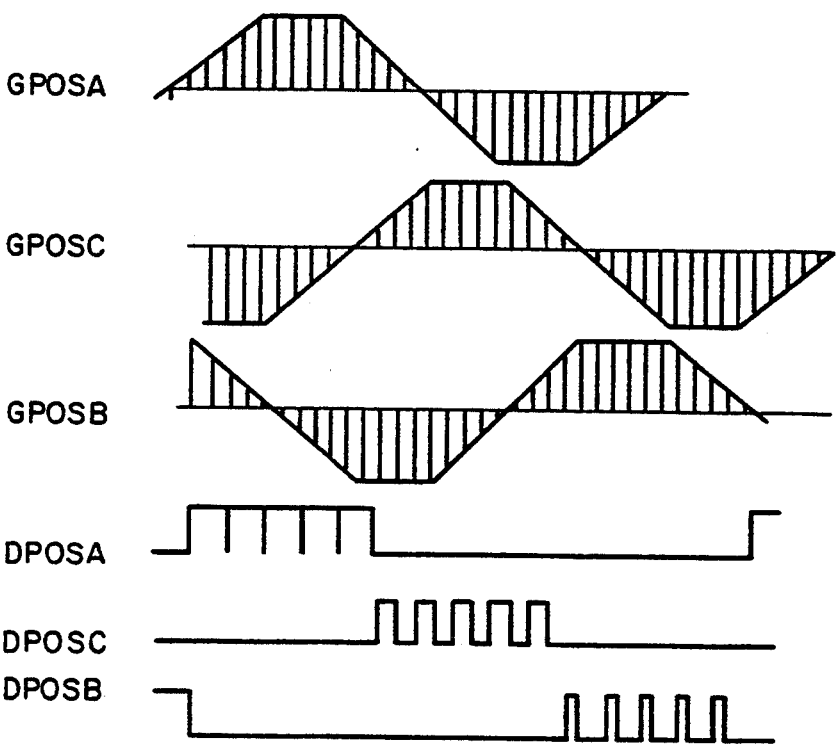
Fig. 4
Fig. 5

CLOCKWISE ROTATION

| DIR | DC | DC* | A | B | C | A+ | B+ | C+ | A- | B- | C- | PSF | |
|---|---|---|---|---|---|---|---|---|---|---|---|---|---|
| 1 | 0 | 0 | 0 | 0 | 0 | 0 | 0 | 0 | 0 | 0 | 0 | 1 | |
| 1 | 0 | 0 | 0 | 0 | 1 | 0 | 0 | 0 | 0 | 0 | 0 | 0 | |
| 1 | 0 | 0 | 0 | 1 | 0 | 0 | 0 | 0 | 0 | 0 | 0 | 0 | |
| 1 | 0 | 0 | 0 | 1 | 1 | 0 | 0 | 0 | 0 | 0 | 0 | 0 | |
| 1 | 0 | 0 | 1 | 0 | 0 | 0 | 0 | 0 | 0 | 0 | 0 | 0 | |
| 1 | 0 | 0 | 1 | 0 | 1 | 0 | 0 | 0 | 0 | 0 | 0 | 0 | |
| 1 | 0 | 0 | 1 | 1 | 0 | 0 | 0 | 0 | 0 | 0 | 0 | 0 | |
| 1 | 0 | 0 | 1 | 1 | 1 | 0 | 0 | 0 | 0 | 0 | 0 | 1 | |
| 1 | 1 | 0 | 0 | 0 | 0 | 0 | 0 | 0 | 0 | 0 | 0 | 1 | STATE 0 |
| 1 | 1 | 0 | 0 | 0 | 1 | 0 | 0 | 1 | 0 | 1 | 0 | 1 | STATE 1 |
| 1 | 1 | 0 | 0 | 1 | 0 | 0 | 1 | 0 | 1 | 0 | 0 | 0 | STATE 2 |
| 1 | 1 | 0 | 0 | 1 | 1 | 0 | 0 | 1 | 1 | 0 | 0 | 0 | STATE 3 |
| 1 | 1 | 0 | 1 | 0 | 0 | 1 | 0 | 0 | 0 | 0 | 1 | 0 | STATE 4 |
| 1 | 1 | 0 | 1 | 0 | 1 | 1 | 1 | 0 | 0 | 0 | 1 | 0 | STATE 5 |
| 1 | 1 | 0 | 1 | 1 | 0 | 1 | 0 | 0 | 0 | 1 | 0 | 0 | STATE 6 |
| 1 | 1 | 0 | 1 | 1 | 1 | 0 | 0 | 0 | 0 | 0 | 0 | 1 | STATE 7 |
| 1 | 0 | 1 | 0 | 0 | 0 | 0 | 0 | 0 | 0 | 0 | 0 | 1 | STATE 0 |
| 1 | 0 | 1 | 0 | 0 | 1 | 0 | 0 | 0 | 0 | 1 | 1 | 0 | STATE 1 |
| 1 | 0 | 1 | 0 | 1 | 0 | 0 | 0 | 0 | 1 | 1 | 0 | 0 | STATE 2 |
| 1 | 0 | 1 | 0 | 1 | 1 | 0 | 0 | 0 | 1 | 0 | 1 | 0 | STATE 3 |
| 1 | 0 | 1 | 1 | 0 | 0 | 0 | 0 | 0 | 0 | 1 | 1 | 0 | STATE 4 |
| 1 | 0 | 1 | 1 | 0 | 1 | 0 | 0 | 1 | 1 | 0 | 0 | 0 | STATE 5 |
| 1 | 0 | 1 | 1 | 1 | 0 | 0 | 0 | 0 | 1 | 1 | 0 | 0 | STATE 6 |
| 1 | 0 | 1 | 1 | 1 | 1 | 0 | 0 | 0 | 0 | 0 | 0 | 1 | STATE 7 |
| 1 | 1 | 1 | 0 | 0 | 0 | 0 | 0 | 0 | 0 | 0 | 0 | 1 | |
| 1 | 1 | 1 | 0 | 0 | 1 | 0 | 0 | 0 | 0 | 0 | 0 | 0 | |
| 1 | 1 | 1 | 0 | 1 | 0 | 0 | 0 | 0 | 0 | 0 | 0 | 0 | |
| 1 | 1 | 1 | 0 | 1 | 1 | 0 | 0 | 0 | 0 | 0 | 0 | 0 | |
| 1 | 1 | 1 | 1 | 0 | 0 | 0 | 0 | 0 | 0 | 0 | 0 | 0 | |
| 1 | 1 | 1 | 1 | 0 | 1 | 0 | 0 | 0 | 0 | 0 | 0 | 0 | |
| 1 | 1 | 1 | 1 | 1 | 0 | 0 | 0 | 0 | 0 | 0 | 0 | 0 | |
| 1 | 1 | 1 | 1 | 1 | 1 | 0 | 0 | 0 | 0 | 0 | 0 | 1 | |

FIG. 11

| DPOSB | DPOSC | DPOSA | STATE |
|---|---|---|---|
| 0 | 0 | 0 | S0 |
| 0 | 0 | 1 | S1 |
| 0 | 1 | 0 | S2 |
| 0 | 1 | 1 | S3 |
| 1 | 0 | 0 | S4 |
| 1 | 0 | 1 | S5 |
| 1 | 1 | 0 | S6 |
| 1 | 1 | 1 | S7 |

FIG. 13

COUNTER CLOCKWISE ROTATION

| DIR | DC | DC* | A | B | C | A+ | B+ | C+ | A- | B- | C- | PSF |
|---|---|---|---|---|---|---|---|---|---|---|---|---|
| 0 | 0 | 0 | 0 | 0 | 0 | | | | | | | |
| 0 | 0 | 0 | 0 | 0 | 1 | | | | | | | |
| 0 | 0 | 0 | 0 | 1 | 0 | | | | | | | |
| 0 | 0 | 0 | 0 | 1 | 1 | } SEE DIR = '1' | | | | | | |
| 0 | 0 | 0 | 1 | 0 | 0 | | | | | | | |
| 0 | 0 | 0 | 1 | 0 | 1 | | | | | | | |
| 0 | 0 | 0 | 1 | 1 | 0 | | | | | | | |
| 0 | 0 | 0 | 1 | 1 | 1 | | | | | | | |
| 0 | 1 | 0 | 0 | 0 | 0 | 0 | 0 | 0 | 0 | 0 | 0 | 1 |
| 0 | 1 | 0 | 0 | 0 | 1 | 0 | 1 | 0 | 0 | 0 | 1 | 0 |
| 0 | 1 | 0 | 0 | 1 | 0 | 1 | 0 | 0 | 0 | 0 | 1 | 0 |
| 0 | 1 | 0 | 0 | 1 | 1 | 1 | 0 | 0 | 0 | 0 | 1 | 0 |
| 0 | 1 | 0 | 1 | 0 | 0 | 0 | 0 | 1 | 1 | 0 | 0 | 0 |
| 0 | 1 | 0 | 1 | 0 | 1 | 0 | 1 | 0 | 1 | 0 | 0 | 0 |
| 0 | 1 | 0 | 1 | 1 | 0 | 0 | 0 | 1 | 0 | 1 | 0 | 0 |
| 0 | 1 | 0 | 1 | 1 | 1 | 0 | 0 | 0 | 0 | 0 | 0 | 1 |
| 0 | 0 | 1 | 0 | 0 | 0 | 0 | 0 | 0 | 0 | 0 | 0 | 1 |
| 0 | 0 | 1 | 0 | 0 | 1 | 0 | 0 | 0 | 0 | 1 | 1 | 0 |
| 0 | 0 | 1 | 0 | 1 | 0 | 0 | 0 | 0 | 1 | 1 | 0 | 0 |
| 0 | 0 | 1 | 0 | 1 | 1 | 0 | 0 | 0 | 1 | 0 | 1 | 0 |
| 0 | 0 | 1 | 1 | 0 | 0 | 0 | 0 | 0 | 1 | 0 | 1 | 0 |
| 0 | 0 | 1 | 1 | 0 | 1 | 0 | 0 | 0 | 1 | 1 | 0 | 0 |
| 0 | 0 | 1 | 1 | 1 | 0 | 0 | 0 | 0 | 0 | 1 | 0 | 0 |
| 0 | 0 | 1 | 1 | 1 | 1 | 0 | 0 | 0 | 0 | 0 | 0 | 1 |
| 0 | 1 | 1 | 0 | 0 | 0 | | | | | | | |
| 0 | 1 | 1 | 0 | 0 | 1 | | | | | | | |
| 0 | 1 | 1 | 0 | 1 | 0 | | | | | | | |
| 0 | 1 | 1 | 0 | 1 | 1 | } SEE DIR.='1' | | | | | | |
| 0 | 1 | 1 | 1 | 0 | 0 | | | | | | | |
| 0 | 1 | 1 | 1 | 0 | 1 | | | | | | | |
| 0 | 1 | 1 | 1 | 1 | 0 | | | | | | | |
| 0 | 1 | 1 | 1 | 1 | 1 | | | | | | | |

Signals: DPOSA, DPOSC, DPOSB

Sequence: S5 | S1 | S3 | S2 | S6 | S4 | S5 | S1

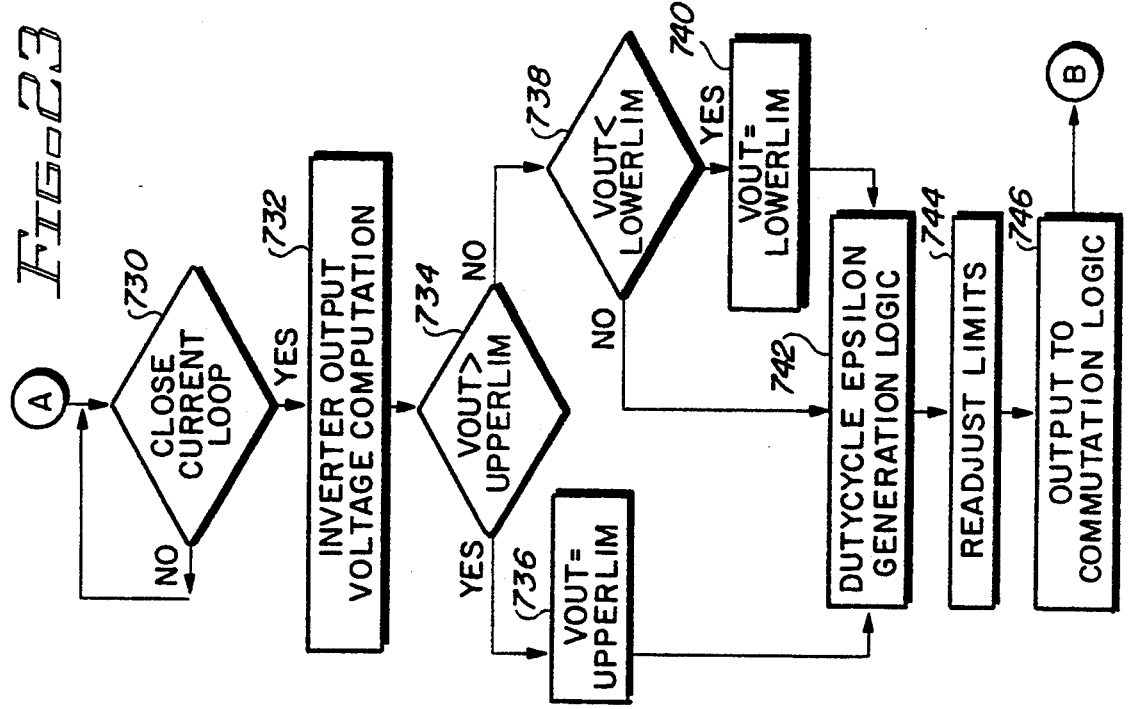

DIGITAL MOTOR CONTROLLER

CROSS-REFERENCES TO RELATED APPLICATIONS

This is a continuation-in-part of U.S. application Ser. No. 550,410, filed Jul. 10, 1990, now abandoned.

BACKGROUND OF THE INVENTION

The present invention relates generally to controllers for electric motors, and more particularly to a digital motor controller for DC brushless motors.

Controllers for electric motor have traditionally analyzed analog control loops and signals in conjunction with limited digital processing to provide both closed loop control and protection. Typically, such analog systems are comprised of a large number of discrete components. These controllers are large, costly and often unreliable.

Further, prior art motor controllers are not interchangeable. In general, a motor controller is configured for the design characteristics (e.g. resistance and inductance) of a particular motor. Design characteristics vary between different motors Power ratings also vary. Therefore, the same controller cannot be used for different motors.

Additionally, prior art motor controllers cannot provide for changing design characteristics of the motor itself. For example, during continued use, the resistance and inductance of the motor are subject to change. These changes may become increasingly more significant with increases in temperature over time as the motor is cycled through a number of operating periods during the course of its operational life. The prior art motor controllers do not allow for changes within motor design characteristics nor can they operate the motor at peak efficiency with precise control of the operational parameters.

In prior art controllers, a problem known as "shoot-through" occurs when controlling the inverter of the motor. An inverter 12 shown in FIG. 2 comprises three pairs of complementary switches 24 and 30, 26 and 32, and 28 and 34. By turning "on" selected switches, two windings can be energized by a power supply. However, if a complementary pair of switches, such as 24 and 30, are conducting at the same time, a short across the power supply occurs. As a result, the power supply is damaged.

For ideal switches, non-overlapping timing signals would prevent complementary switches from conducting at the same time. However, the switches are not ideal; they are formed by transistors, which have internal capacitances. Thus, as one transistor is charging and the other is discharging, the two transistors can conduct simultaneously. As a result, shoot-through occurs.

The limitations of prior art motor controller systems are magnified in the case where two or more motors are physically coupled to a single output in an effort to increase the total power output of the system. For these types of systems, prior art controllers are not capable of communicating with one another to provide precise synchronized motor control.

SUMMARY OF THE INVENTION

The disadvantages of the prior art motor controllers are overcome by the present invention. Apparatus for controlling a brushless motor having a rotor, multiple stator windings and sensing means comprises, digitizing means, digital signal processor means communication means and inverter means. The sensing means determines the position of the rotor with respect to the multiple stator windings. The digitizing means digitizes analog position signals generated by the sensing means. The digital signal processor means processes the digital signals provided by the digitizing means to select the stator windings to be energized. In response to the outputs of the digital signal processor means, the commutation means generates commutation commands, which cause the inverter means to energize selected windings. By commanding commutation, the digital signal processor means allows for precise control of motor speed, output power and rotor position.

BRIEF DESCRIPTION OF THE DRAWINGS

FIG. 1 is a block diagram of a digital motor controller system including a digital motor controller according to the present invention, an inverter, a motor and position and current sensors.

FIG. 3 is a depiction of analog signals provided by the position sensors.

FIG. 4 depicts the envelopes of values sampled from the analog signals shown in FIG. 3.

FIG. 5 is a depiction of modulated commutation signals.

FIG. 11 is a truth table for rotation of the motor in a clockwise direction.

FIG. 12 is a truth table for rotation of the motor in a counterclockwise direction.

FIG. 13 is a tabulation of positions for the digital position signals.

FIG. 14 depicts the states for the digital position signals.

FIG. 21 is a table for selecting a feedback current.

FIGS. 22 and 23 are a flowchart of a DSP program for closed loop control of the motor.

DETAILED DESCRIPTION OF THE PREFERRED EMBODIMENT

Figure 2:
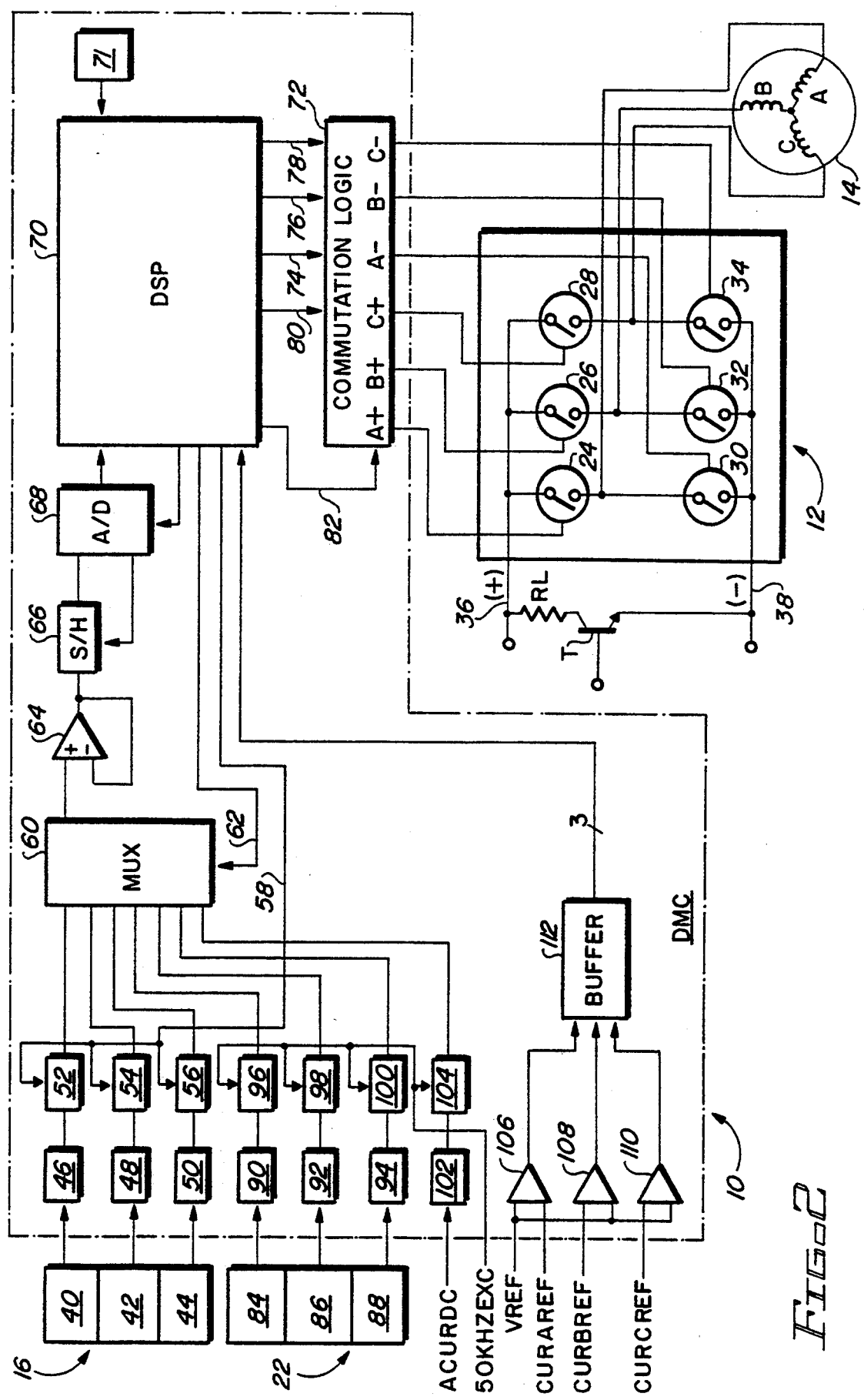
FIG. 2 is a block diagram of the digital motor controller.

Referring to FIG. 1, position sensors 16 provide position signals to a digital motor controller (DMC) 10. The DMC 10 processes these signals to provide commutation commands to an inverter 12. The commutation commands cause the inverter 12 to energize selected stator windings of a motor 14. Further, the DMC 10 uses the processed signals to determine the relative angular position, direction, and speed of the motor 14. From digital position command signals on a data bus 18 and analog position command signals on conductor 20, the DMC 10 uses position and speed loops. Current sensors 22 provide data information concerning the excitation currents directed to the motor 14. The DMC 10 uses this data to close a current loop and perform diagnostic checks.

Referring now to FIG. 2, the motor 14 includes three stator windings A, B and C that are connected in a wye bipolar configuration. It should be noted that the DMC 10 can control a motor having any number of windings. Within the inverter 12, three upper switches 24, 26 and 28 and three lower switches 30, 32 and 34 are arranged in a standard three phase inverter configuration to commutate power to the stator windings A, B and C. Each switch is formed by a single transistor, or by several transistors connected in parallel. A positive operating potential is provided by DC link high 36 to the high side of switches 24, 26, and 28, which are actuated by commutation signals A+, B+ and C+, respectively, from the DMC 10. A negative operating potential is provided by DC link return 38 to the switches 30, 32 and 34, which are actuated by commutation signals, A−, B− and C−, respectively, from the DMC 10. The low side from switch 24 and the high side of switch 30 are both connected to winding A in common. Similarly the low side from switch 26 and high side of switch 32 are connected to winding B, and the low side from switch 28 and high side of switch 34 are connected to winding C. The inverter 12 and motor 14, which is a brushless DC motor, are well known to those skilled in the art.

During motor driving operation, only one of the upper switches 24, 26 and 28 is "on" at any particular time, and only one of the lower switches 30, 32 and 34 is "on" at any particular time. Further, complimentary switches are never on at the same time; otherwise, shoot-through occurs. Thus, current will flow through a path which serially includes the DC link high 36, an upper switch 24, 26 or 28 that is "on", two of the stator windings A, B, or C, a lower switch 30, 32, or 34 that is on, and the DC link return 38. As the motor rotor is forced to a different orientation, the DMC 10 commands "on" a different pair of upper and lower switches to commutate the operating potential delivered to the windings A, B or C of the motor 14.

Within the motor 14, the position sensor 16 includes motor position sensors 40, 42, and 44, which are positioned proximate to the windings A, B and C respectively. These sensors 40, 42 and 44 generate analog position signals APOSA, APOSB and APOSC, which provide the raw data position signals. The analog position signals, APOSA, APOSC, and APOSB are produced by sending a carrier signal to the sensors 40, 42 and 44, which then individually amplitude modulate their outputs to varying levels as the rotor shaft turns through 360 degrees. Accordingly, the signals APOSA, APOSB, APOSC appear to be sinusoidally varying signals which are phase displaced by 120°, respectively, and which depend upon motor rotor position (see FIG. 3). A frequency of 50 kHz for the carrier signal is sufficient to produce a number of positive and negative peaks for each cycle. The sensors 40, 42 and 44 are disclosed in European Patent Application No. 0 190 918 A1.

Sinusoidally varying and amplitude modulated, the position signals APOSA, APOSB and APOSC are filtered by anti-aliasing filters 46, 48 and 50 to remove harmonics. The outputs of the anti-aliasing filters 46, 48 and 50 are supplied to sample and hold circuits 52, 54 and 56 respectively. Timing signals, issued over conductor 58, enable the sample and hold circuits 52, 54 and 56 to sample the analog signals APOSA, APOSB and APOSC at the same time. The sample and hold circuits 52, 54 and 56 are phase delayed by 90 degrees to trail the initiation of the of the 50 kHz carrier signal. Thus, the sample and hold circuits 52, 54 and 56 obtain the peak values of the analog signals APOSA, APOSB and APOSC. Envelopes GPOSA, GPOSB and GPOSC of the values from the analog signals APOSA, APOSB and APOSC are depicted in FIG. 4. The values sampled by the sample and hold circuits 52, 54, and 56 are then routed to a multiplexer 60 which serially outputs the signals. The multiplexer 60 receives control signals via conductor 62, which control signals allow for correct sequencing of the multiplexer output signals. The output signals are supplied to a buffer 64. An output of the buffer 64 is supplied to sample and hold circuit 66, which allows the multiplexer 60 to settle on a new input value while the analog to digital converter 68 is converting the previous input. The output of the sample and hold circuit 66 is converted into a digital format by a flash analog to digital converter 68.

The digitized samples from the envelopes GPOSA, GPOSB and GPOSC are then forwarded to a digital signal processor (DSP) 70 where they are processed into digital position signals DPOSA, DPOSB and DPOSC. The DSP 70 can be an ADSP 210X, which is sold by Analog Devices, or any equivalent microprocessor. Because such microprocessors are well known, a description of its architecture is not necessary. The selection of a particular microprocessor is left to a person skilled in the art.

Figure 22:
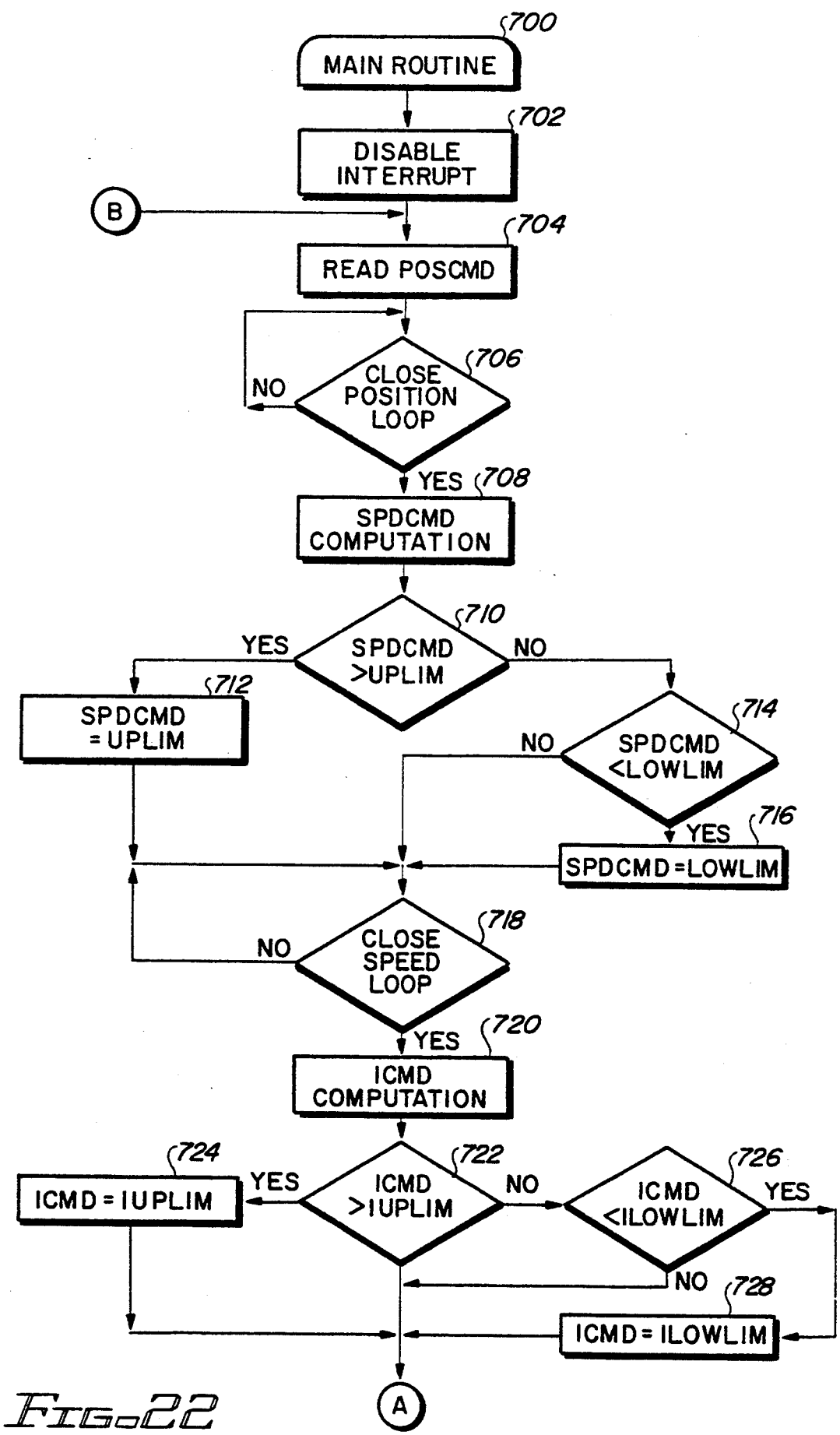

A program and scratch pad and tables and constants for the DSP 70 are stored in electronic memory 71. The program includes an interrupt program (FIG. 6), subroutines for deriving the digital position signals DPOSA, DPOSB and DPOSC (FIG. 8), speed feedback (FIG. 17), current feedback (FIG. 18) and a program for loop control (FIGS. 22 and 23).

The digital position signals DPOSA, DPOSB and DPOSC are supplied to a commutation logic cell 72 via data buses 74, 76 and 78, respectively. Over conductor 80, the DSP 70 provides a direction command DIRCMD, which indicates the commanded direction of motor rotation. In response to these signals, the commutation logic cell 72 provides the six commutation signals A+, B+, C+, A−, B−, and C− to switches 24, 26, 28, 30, 32, and 34, respectively, of the inverter 12. The commutation logic signals A+, A−, B+, B−, C+ and C− are modulated by a modulation frequency, such as an 18 kHz signal, which is selected by the DSP 70. The DSP 70 provides a duty cycle command DCCMD to the commutation logic cell 72 via data bus 82. The duty cycle command DCCMD varies the pulse width of the modulated frequency to control motor speed. Thus, the commutation logic cell 72 effectively modulates the commutation signals A+, A−, B+, B−, C+ and C− by varying the duration of the "on" time within the 18 kHz signal and thereby reducing the speed and power output of the motor 14. For example, the motor 14 can be operated near 100% power for the "on" time for phase A, 50% power for the "on" time for phase C, and 20% power for the time of phase B, due to the variation of the "on" duration within the 18 kHz signal, from 100% to 50% to 20% respectively (see FIG. 5). As described above, the switches 24, 26, 28, 30, 32 and 34 commutate the positive voltage potential and negative voltage potential into and out of the motor phase windings A, B and C.

The current sensor 22 includes three saturable core type current sensing elements 84, 86 and 88, which are basically inductor coils wrapped about the electrical leads to motor windings A, B, and C, respectively. A 50 kHz square wave excitation voltage is applied to the sensing elements 84, 86 and 88. When a winding A, B, or C is energized, the associated current sensing element 84, 86, 88 saturates rapidly. The 50 KHz excitation voltage then produces a square wave current output signal which lags the square wave voltage input by 90 degrees. The square wave current output signals from each of the three current sensing elements 84, 86, and 88 are the analog current phase signals ACURA, ACURB, and ACURC, respectively. The analog current phase signals ACURA, ACURB and ACURC are filtered by anti-aliasing filters 90, 92 and 94, respectively, and sampled by sample and hold circuits 96, 98 and 100, respectively. The sampling times are synchronized to the trailing edge of the 50 kHz excitation signal. In addition, an analog DC link current ACURDC is forwarded to an anti-aliasing filter 102 and sample and hold circuit 104. The outputs of the sample and hold circuits 96, 98, 100 and 104 are forwarded to the multiplexer 60, which outputs the signals in a serial stream. The analog to digital converter 68 converts these sampled analog currents to a digital DC link current DCURDC and to digital phase currents DCURA, DCURB and DCURC, whose values vary in magnitude based upon the input power to the associated winding A, B or C.

Reference currents CURAREF, CURBREF and CURCREF are taken from center taps of the current sensor elements 84, 86, and 88 respectively. These currents are respectively received by three comparators 106, 108, and 110. The comparators 106, 108 and 110 also receive a voltage reference signal (VREF). Each of these comparators 106, 108, 110 compares the reference currents CURAREF, CURBREF, and CURCREF respectively, to the voltage reference signal VREF and produces an output which is directed to a buffer 112. Under control from the DSP 70, the buffer 112 settles on values for the reference currents. CURAREF, CURBREF and CURCREF, which are supplied to the DSP 70, where they are used in the current loop. Also, the currents are used for diagnostic checks.

With the addition of an I/O controller (not shown), the DMC 10 can be integrated into other systems, such as aircraft and spacecraft spacecraft. The I/O controller provides interface capability between the DMC 10 and external electronics. The I/O controller receives and transmits the input commands so as to monitor the status of the DMC 10, incorporates a built-in test loop, and provides temperature and power supply voltage measurements.

Further, the performance of the DMC 10 can be enhanced with the addition of the following elements: a "watchdog timer" which interrogates the DMC 10 to ensure that the system is healthy and fault-free; an interrupt timer, which notifies the DMC 10 of time to receive a position command POSCMD, and time to shut down in the event of a power failure; and a write discrete latch, whose contents notify the outside world of the reasons for system shutdown (e.g., overcurrent). The DMC 10 can also be provided with a frequency divider, which divides a single clock signal into a number of lower-frequency clock signals. Thus, different timing signals can be provided to the DMC 10 by a single clock generator and the frequency divider.

Figure 6:
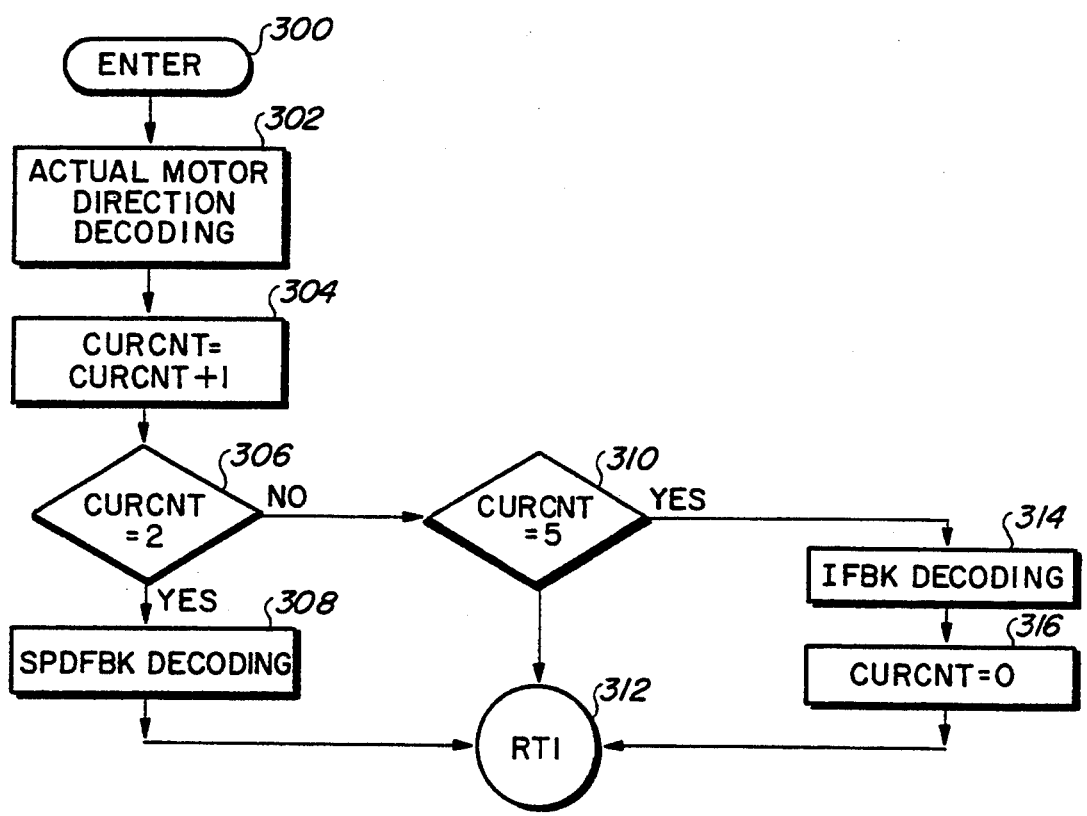
FIG. 6 is a flow chart of an interrupt routine, performed by a DSP, which forms a part of the digital motor controller.

Referring now to FIG. 6, there is shown a flowchart of an interrupt routine, which is entered (module 300) by the DSP 70 every twenty microseconds. Every twenty microseconds, the DSP 70 executes a subroutine for motor direction decoding (module 302). This subroutine yields the digital position signals DPOSA, DPOSB and DPOSC. Thus, the digital position signals are updated 50,000 times per second. This subroutine is described in detail in connection with FIGS. 7 and 8.

The interrupt routine provides an internal counter CUR_CNT, which is incremented every twenty microseconds (module 304) and reset every 100 microseconds (module 316). When the counter CUR_CNT equals one, three and four (module 310), the DSP 70 exits the interrupt routine (module 312).

When counter CUR_CNT equals two (module 306), the DSP 70 performs speed feedback decoding (module 308). Here, the DSP 70 uses the digital position signals DPOSA, DPOSB and DPOSC to determine speed feedback signals. Thus, the speed feedback signals are updated 10,000 times per second. The speed feedback signals are described in detail in connection with FIGS. 13–17.

When counter CUR_CNT equals five (module 310), the DSP 70 furnishes a current feedback signal (module 314). The current feedback signal is determined from the digital position signals DPOSA, DPOSB and DPOSC, the current references CURAREF, CURBREF and CURCREF and the digital phase currents DCUIA, DCURB and DCURC. Thus, the currents and feedback signals are updated 10,000 times per second. The current feedback signal is described in detail in connection with FIGS. 18–21.

Figure 7:
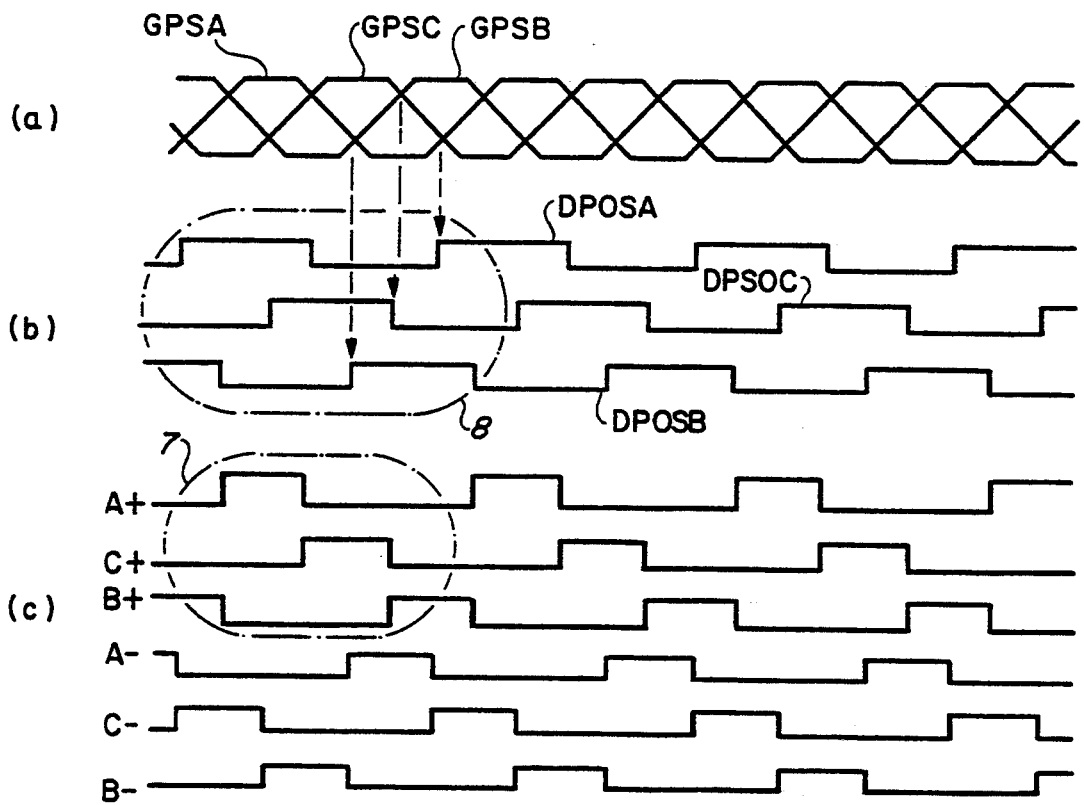
FIG. 7 is a graphic representation of the digital position signals and the commutation signals derived therefrom.

FIG. 7 illustrates how the DSP 70 processes the samples from the envelopes GPOSA, GPOSC and GPOSB. To facilitate an understanding of the processing, the envelopes GPOSA, GPOSC and GPOSB are superimposed in FIG. 7a. In general, the DSP 70 compares sampled values from consecutive envelopes. The digital signal for a position sensor goes high when the sampled value from its envelope is greater than the sampled value from the next envelope. In this manner, each digital signal indicates the proximity of the rotor relative to a corresponding winding and the adjacent winding. FIG. 7b illustrates the digital signals DPOSA, DPOSC and DPOSB resulting from the comparison.

Figure 8:
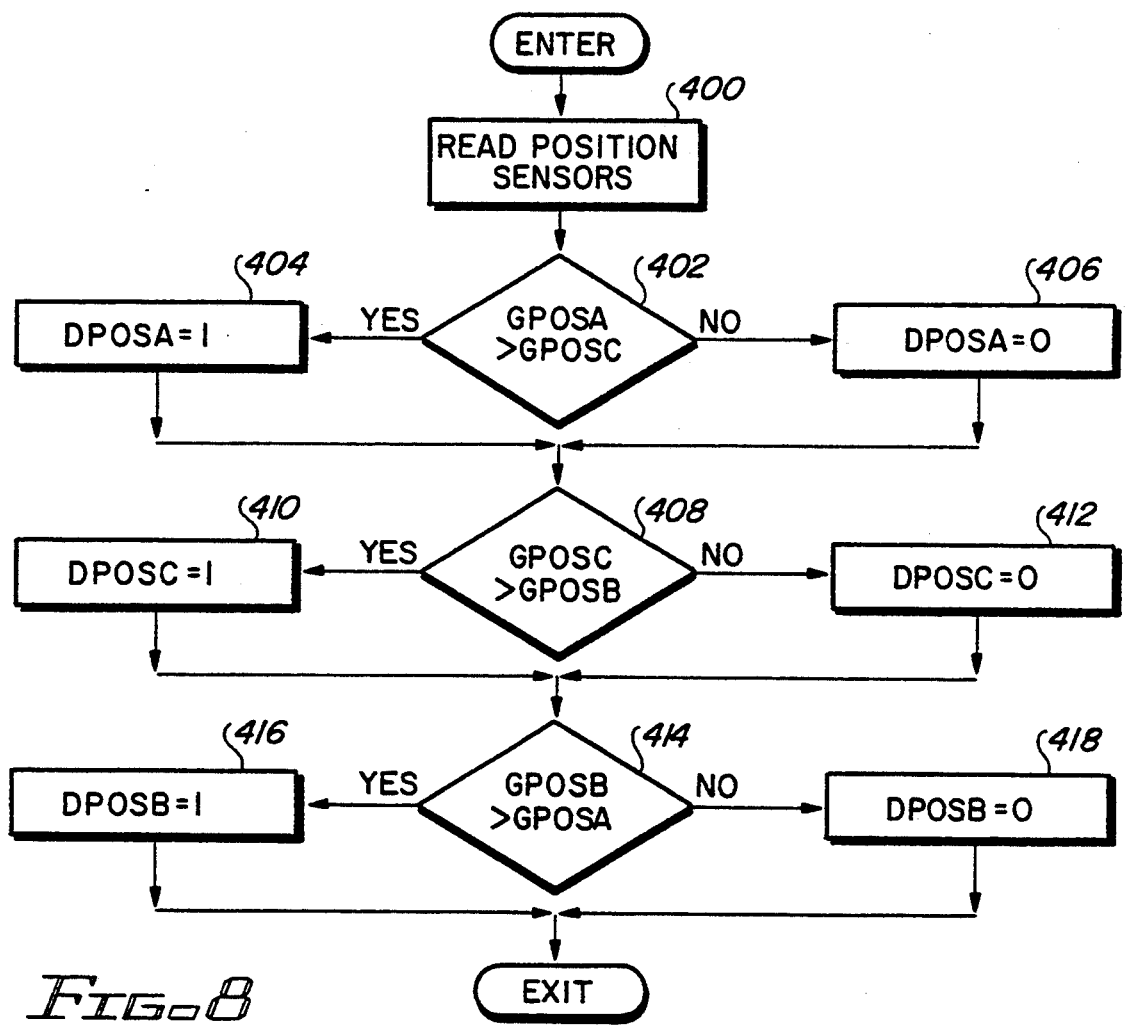
FIG. 8 is a flowchart of a DSP subroutine for deriving digital position signals from analog signals provided by the rotor position sensors.

Additionally, FIG. 8 is a flowchart of a DSP 70 routine for processing sampled values from the envelopes GPOSA, GPOSB and GPOSC. First, the DSP 70 obtains data concerning the position of the rotor (module 400). The DSP 70 sends the timing signal over conductor 58, which signal causes the sample and hold circuits 52, 54 and 56 to sample the analog position signals APOSA, APOSB and APOSC provided by the position sensor 20. Afterwards, the DSP 70 sends control signals over conductor 62 to the multiplexer 60, which control signals enable the multiplexer 60 to output the sampled values from envelopes GPOSA, GPOSB and GPOSC. The DSP 70 reads the output of the A/D converter 68.

The digital position signal DPOSA is determined by comparing the value sampled from the envelope GPOSA to a value sampled from the envelope GPOSC (module 402). When the sampled value of the envelope GPOSA is greater than that of envelope GPOSC, the digital position signal DPOSA is set high (module 404); otherwise, the digital position signal DPOSA is set low (module 406). Similarly digital position signal DPOSC is determined by comparing the values sampled from envelope GPOSC to that of envelope GPOSB (module 408). Signal DPOSC is set high when envelope GPOSC is greater than envelope GPOSB (module 410) and low when envelope GPOSB is less than envelope GPOSC (module 412). Finally, digital position signal DPOSB is determined by comparing envelope GPOSB with envelope GPOSA (module 414). When envelope GPOSB is greater than envelope GPOSA, digital signal DPOSB is high (module 416), and when envelope GPOSA is greater than envelope GPOSB, digital signal DPOSB is low (module 418). These digital position signals DPOSA, DPOSB, DPOSC, which are shown in FIG. 6b, are utilized in the DSP 70 to determine the rotor position and the actual direction of the motor, to provide current feedback, and to indicate position sensor failures. The commutation logic cell 72 utilizes the digital position signals DPOSA, DPOSB and DPOSC to provide commutation commands to the inverter 12.

Figure 10:
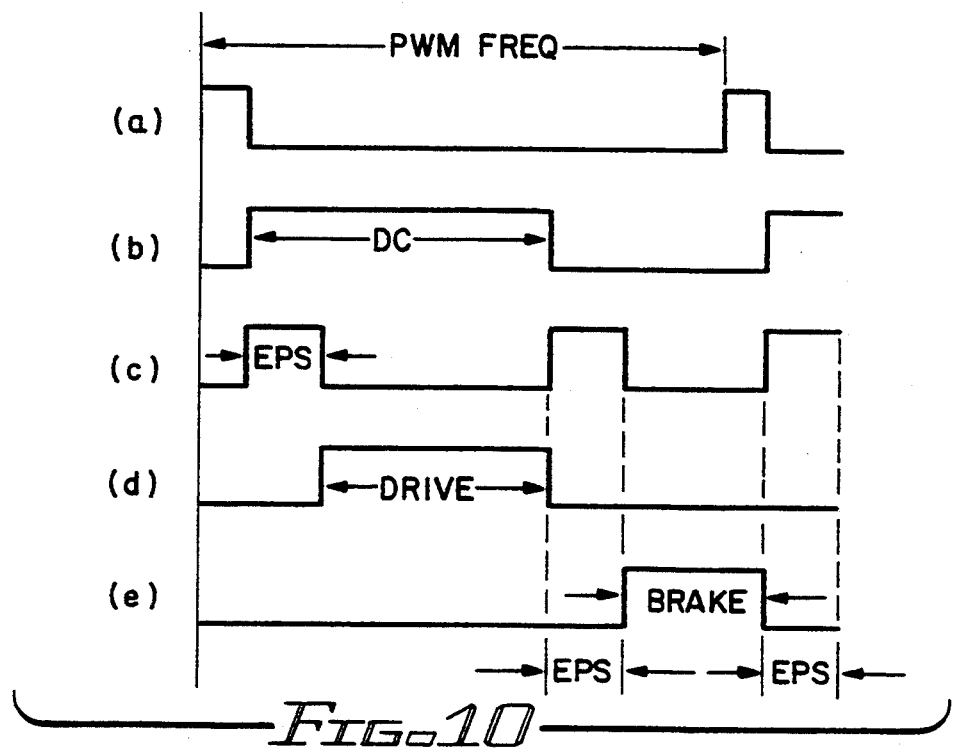
FIG. 10 is a timing diagram for the commutation logic.
Figure 9:
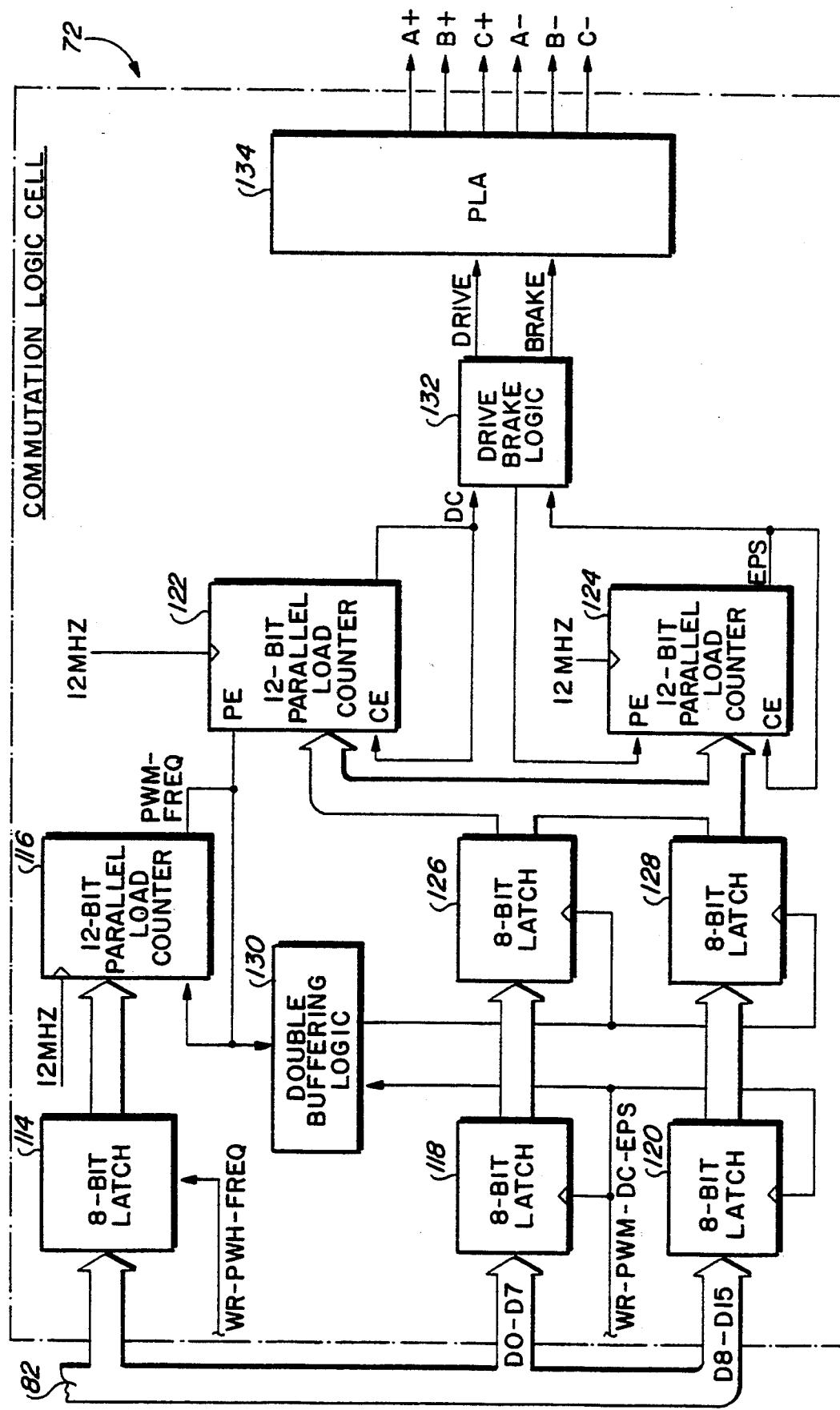
FIG. 9 is a block diagram of commutation logic which forms a part of the digital motor controller.
Figure 15:
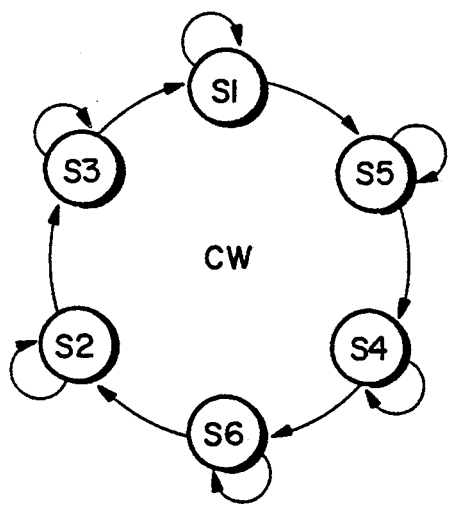
FIG. 15 is a state diagram for clockwise rotation of the rotor.
Figure 16:
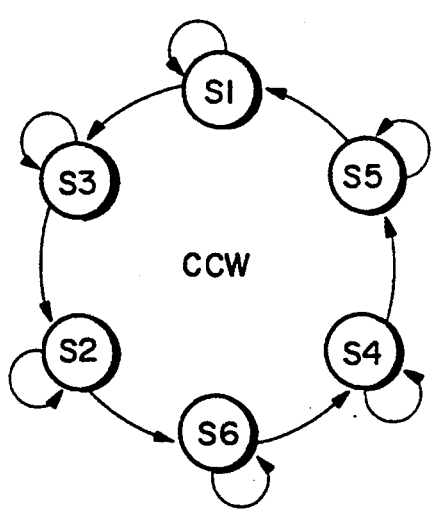
FIG. 16 is a state diagram for counterclockwise rotation of the rotor.
Figure 19:
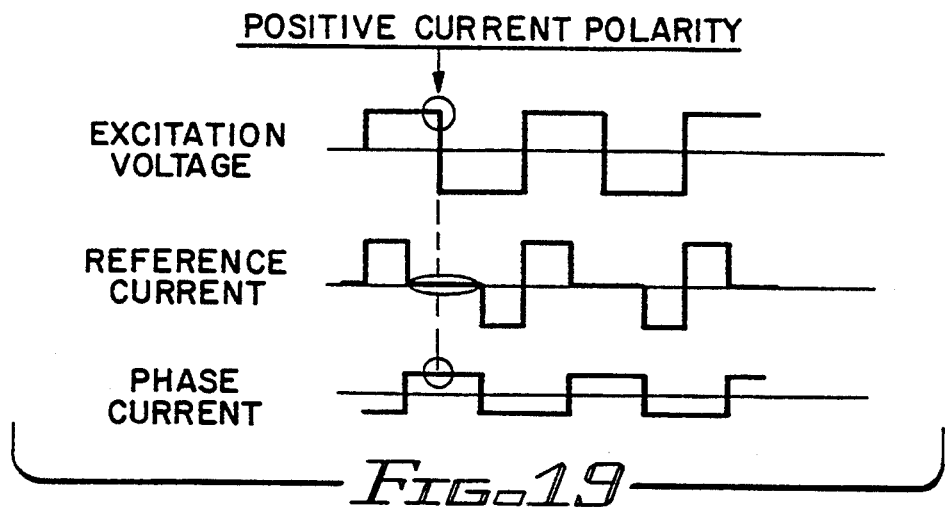
FIG. 19 depicts a current sensing signal having a negative polarity.

Referring now to FIG. 9, there is shown a preferred embodiment of the commutation logic cell 72. The DSP 70 programs a modulation frequency by placing an 8-bit frequency command on the data bus 82 and strobing a first clock signal WR-PWM-FREQ, which sets bits D0–D7 of a first latch 114. The contents of the first latch 114 are loaded into a first counter 116, which is a free running counter. The first counter 116 is clocked at 12 MHz. Whenever the first counter 116 reaches its terminal count, its carry out goes high, and it performs a parallel load of the contents of the first latch 114. Because the carry-out of the first counter 116 is coupled to its clear enable, the carry-out goes low on the next 12 MHz pulse. Thus, a pulse is provided on the carry-out. As the contents of the first latch 114 are increased in value, the frequency of pulses on the carry-out of the first counter increases, i.e. the terminal count is reached faster (see FIG. 10a). In this manner, the carry-out of the first counter 116 furnishes a signal PWM-FREQ having the modulation frequency selected by the DSP 70.

Bits D0–D11 of the duty cycle command DCCMD contain the duration of the duty cycle. When the duty cycle command DCCMD is placed on the data bus 82, the DSP 70 strobes a second clock signal WR-PWM-DC, which sets bits D0–D7 of a second latch 118 and bits D8–D11 of a third latch 120. With each parallel load, a second counter 122 counts up to the terminal count and then provides a pulse on its carry out. The pulse goes high at the parallel load and goes low as the terminal count is reached (see FIG. 10b). The carry-out of the second counter 122 furnishes a duty cycle DC.

The DSP 70 adjusts the pulse width of the duty cycle DC to insure against shoot-through. The initial "on" time of a selected transistor (switch) in the inverter 12 is reduced by an interval EPS. The interval EPS is a short time interval of "off" time during which the base charge of a complementary transistor in the inverter 12 is removed. Thus, the selected transistor is not turned on until its complimentary transistor has had time to discharge. The duration of the interval EPS depends upon the current that the transistors conduct. Higher currents require more time for the removal of the base charge from the complementary transistor. To reduce "on" time, bits D12–D15 of the duty cycle command DCCMD, which contain a value for the interval EPS, are loaded into the third latch 120. A third counter 124 operates to count up to the terminal count and then stop until the next parallel load. A count enable CE is used to halt the third counter 124. The third counter 124 provides a pulse having a duration equal to the interval EPS (see FIG. 10c). The pulse coincides with the leading edge of each duty cycle DC.

The number of possible pulse width modulated frequencies ranges from 5.9 KHz to 1.5 MHz The resolution of the pulse width modulated frequency is 83 nanoseconds. With the pulse width modulated frequency set at 18 KHz and the first counter 116 clocked at 12 MHz, the duty cycle can vary from 0–100 percent with a resolution of 0.15 percent. The interval EPS can be adjusted from 0.33 microseconds to 5.2 microseconds with a resolution of 83 nanoseconds.

Because the first and second clock signals WR-PWM-FREQ and WR-PWM-DC are not synchronized, double buffering is necessary to prevent the DSP 70 from writing into the second and third latches 118 and 120 while the second and third latches 118 and 120 are loading their respective counters 122 and 124. A fourth latch 126 is disposed between the first latch 118 and second counter 122, and a fifth latch 128 is disposed between the third latch 120 and the third counter 124. The fourth and fifth latches 126 and 128 are normally clocked by double buffering logic 130 just prior to the second and third counters 122 and 124 being parallel loaded. However, if the DSP 70 happens to be updating the second and third latches 118 and 120 at the same time, the clocking of the third and fourth latches 126 and 128 will be skipped until the next parallel load. Double buffering is well known to those skilled in the art.

The duty cycle DC and interval EPS are supplied to drive/brake logic 132. The drive/brake logic 132 removes the interval EPS from the duty cycle DC (see FIG. 10d). Thus, the duty cycle DC goes low whenever the interval EPS goes high. The duty cycle DC is provided on a first output of the drive/brake logic 132. This signal is employed to drive the motor 14 (i.e., put power into the motor 14). The drive/brake logic 132 further provides an inverse duty cycle DCINV, which is used to brake the motor 14 (i.e., remove power from the motor 14). Whenever the duty cycle DC is low and the output interval EPS goes low, the signal DCINV goes high (see FIG. 10e). Thus, the width of the inverse duty cycle DCINV is also controlled by the duty cycle command DCCMD. The drive/brake logic 132 can be realized by a person skilled in the art.

The duty cycle DC and inverse duty cycle DCINV are supplied to respective inputs of a programmable logic array (PLA) 134. The digital position signals DPOSA, DPOSB and DPOSC and the direction command DIRCMD are also supplied to respective inputs of the PLA 134. The PLA 134 realizes the truth table shown in FIGS. 11 and 12.

The truth table shown in FIG. 11 corresponds to clockwise rotation of the motor 14. Note that the direction command DIRCMD is always high. Whenever the duty cycle DC and the inverse duty cycle DCINV have the same values, all the switches 24, 26, 28, 30, 32 and 34 in the inverter 12 are switched off. Note that all three signals DPOSA, DPOSC and DPOSB do not go high simultaneously (state 7), nor do they go low simultaneously (state 0). If they do, a signal PSF indicating position sensor failure goes high. Thus, the DMC 10 provides an error flag when the position sensor 16 fails.

Whenever the duty cycle DC is high and the inverse duty cycle DCINV is low, the motor 14 is driven in the clockwise direction. When only signal DPOSC is high, the commutation signals C+ and B− go high (state 1). When only signal DPOSB is high, commutation signals B+ and A− go high (state 2). When signals DPOSB and DPOSC are high, commutation signals C+ and A− go high (state 3). When only the signal DPOSA is high, the commutation signals A+ and C− go high (state 4). When signals DPOSC and DPOSA are high, the commutation signals A+ and B− go high (state 5). When signals DPOSB and DPOSA are high, commutation signals B+ and C− go high (state 6). The set of inputs and corresponding commutation signals A+, A−, B+, B−, C+ and C− for clockwise drive are depicted in FIGS. 6b and 6c.

Whenever the duty cycle DC is low and the inverse duty cycle DCINV is high, the motor is braked. Braking allows the back emf generated by the motor 14 to flow back into the power source. When only signal DPOSC is high, the commutation signals C− and B− go high (state 1). When only signals. DPOSB is high, commutation signals B− and A− and C− (state 2). When signals DPOSB and DPOSC are high, commutation signals C− and A− go high (state 3). When only the signal DPOSA is high, the commutation signals A− and C− go high (state 4). When signals DPOSC and DPOSA are high, the commutation signals A− and B− go high (state 5). When signals DPOSB and DPOSA are high, commutation signals Band C− go high (state 6). Thus, the DMC 10 controls the current arising from back emf.

If the back emf goes very high, the power source can be damaged. Further, certain applications do not allow the back emf to flow into the power source. Thus a load resistor RL is provided to dissipate the back emf. The load resistor RL is coupled between the DC link high 36 and the collector of a transistor T, whose emitter is coupled to the DC Link return 38 (see FIG. 3). The transistor T has the same power rating as the transistors in the inverter 12. The DSP 70 causes the transistor T to conduct when the DC Link voltage exceeds the power rating of the transistors. Thus, the voltage on the DC Link high 36 is digitized and supplied to the DSP 70. When the DC link voltage is greater than power rating of the transistors (e.g. 300 VDC), the DSP 70 sends a signal to the base of transistor T, which connects the load resistor RL between the DC Link high 36 and DC Link return 38. As a result, the load resistor dissipates the back emf.

The truth table shown in FIG. 12 corresponds to counterclockwise rotation of the motor 14. For the first and fourth sets of inputs, no power is supplied to the motor 14. For the second set of inputs, the motor 14 is driven in the counterclockwise direction. For the third set of inputs, the motor 14 is braked as it rotates in the counterclockwise direction.

Referring now to FIGS. 13-16, the DSP 70 determines motor position, speed and direction of rotation from the digital position signals DPOSA, DPOSB, and DPOSC. As previously discussed, within any complete cycle (i.e., electrical rotation of 360°) there are six possible states (i.e., positions) for the three digital signals DPOSA, DPOSB, and DPOSC. These six active positions are designated S1, S2, S3, S4, S5, and S6. From FIGS. 13 and 14, it is apparent that each state represents the binary values of the digital signals DPOSB, DPOSC, and DPOSA. Also included in the tabulation are the two error positions S0 and S7, which indicate position sensor failure. Each of the six positions S1-S6 represents a known sixty degrees of motor rotor position. Thus, a determination of the present state gives a coarse indication of the motor orientation. A zero position or orientation (i.e. 0°) may be assigned at a selected transition point, for example, the S3-S1 transition point. Relative to this assigned zero position, the transition point S1 to S5 will occur at 60° S5 to S4 will be at 120°, S4 to S6 will be at 180°, S6 to S2 will be at 240°, S2 to S3 will be at 300° and S3 to S1 will be at 360° which is also the 0° position. Thus a sequence for the position states S1-S5-S4-S6-S2-S3-S1, or any portion thereof, represents rotation in the clockwise direction (see FIG. 15). Conversely a sequence of S1-S3-S2-S6-S4-S5-S1, or any portion thereof, represents rotation in the counter clockwise direction (see FIG. 16). It should be emphasized that only one such transition between position states is required to determine the direction of the motor 14.

Figure 17:
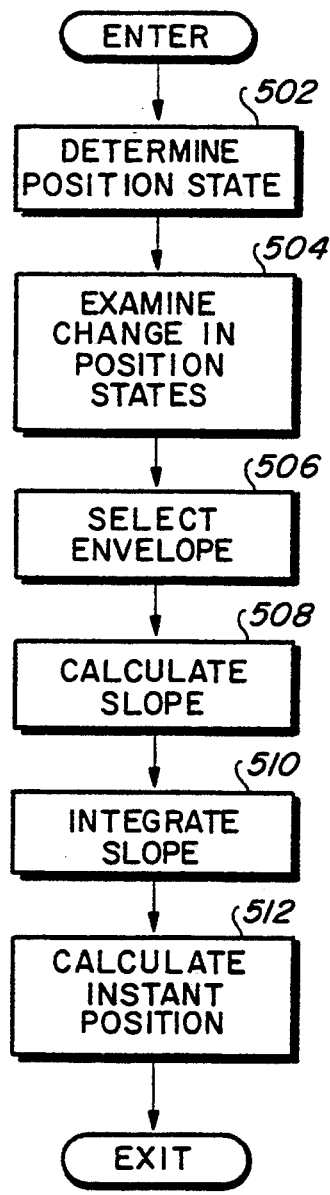
FIG. 17 is a flowchart of a DSP subroutine for calculating direction, speed and position of the rotor.

Referring now to FIG. 17, there is shown a flowchart of a DSP subroutine for determining direction, speed and position of the rotor. By keeping track of the position states S1-S6, the coarse position of the motor 14 is always known (module 502). The DSP 70 examines changes in the position states S1-S6 to determine the direction of the motor rotation (module 504). Then, the DSP 70 looks at the slope and value of the envelopes GPOSA, GPOSB, and GPOSC to determine the instantaneous speed and fine position, respectively, of the motor 14. As described above, the envelopes GPOSA, GPOSB and GPOSC comprise a series of sampled values taken from the analog position signals APOSA, APOSB, and APOSC. The DSP 70 takes samples from the envelope having a non-zero slope (module 506). For position state S1, the speed is determined from the slope of the envelope GPOSB. The remaining envelopes and their corresponding states are shown in Table 1. The slope of the envelope GPOSA, GPOSB or GPOSC is calculated as the difference between successive samples divided by sampling time (module 508). As the sampling time approaches zero, the slope approaches the instantaneous speed. If the slope of the selected envelope GPOSA, GPOSB or GPOSC is negative, its sign is inverted such that the speed always has a positive value. The instantaneous speed can be used as a speed feedback signal.

TABLE 1

| Position State | Motor Speed |
|---|---|
| S1 | GPOSB |
| S2 | GPOSC |
| S3 | −GPOSA |
| S4 | GPOSA |
| S5 | −GPOSC |
| S6 | −GPOSB |

The instantaneous speed of the motor 14 is then integrated to determine the fine (i.e., precise angular) position of the motor 14 (module 510). Instantaneous position is determined by combining coarse and fine position (module 512). An example may best illustrate this procedure. When the motor 14 moves from position state S5 to position state S1, the DSP 70 can determine that the direction is counterclockwise. A determination of the slope of the selected envelope GPOSB yields a precise angular rotational speed, for example 1000 revolutions per second (rps) or 360,000 degrees per second. At any desired time between position state, for example, fifty-six microseconds after the switching from S5 to S1, the slope is integrated over the desired time. The integration indicates that the rotor has rotated −20 degrees from state S5. By adding the coarse position (60 degrees) to the fine position (−20 degrees), a precise position (40 degrees) from the zero point is obtained. The DSP 70 continuously performs this computation. It updates changing speeds to recalculate the exact position of the motor 14. Updates are performed 10,000 times per second. Thus, the DSP 70 can keep track of the exact angular position of the motor rotor. Exact angular position is used as a position feedback signal.

Figure 20:
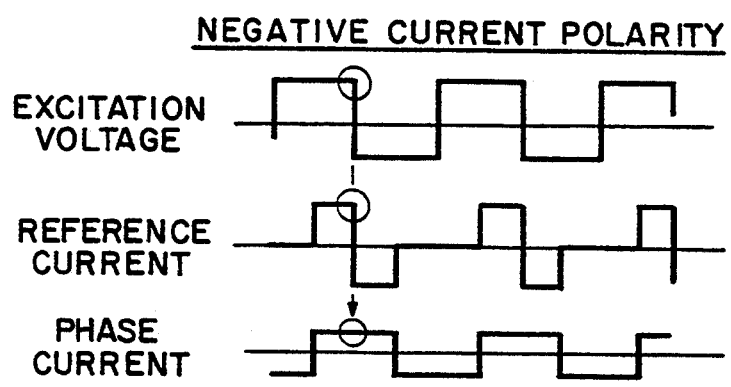
FIG. 20 depicts a current sensing signal having a positive polarity.
Figure 18:
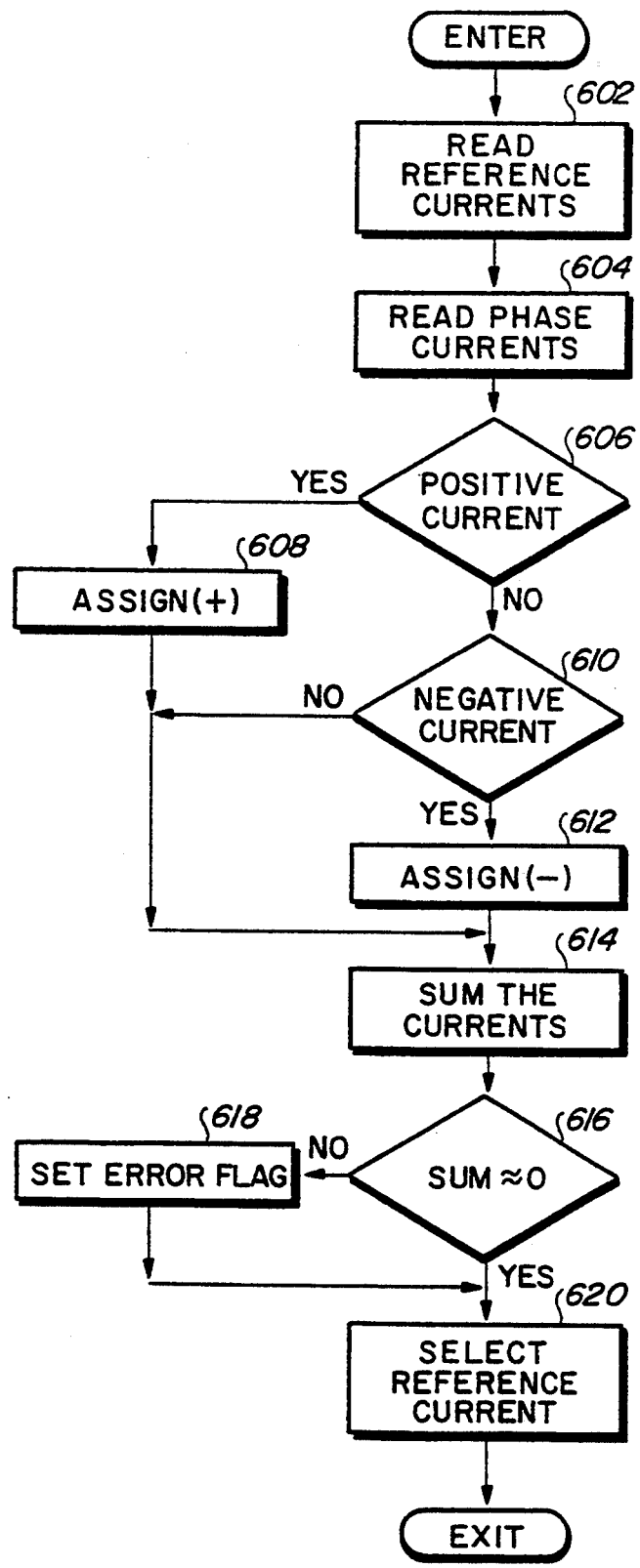
FIG. 18 is a flowchart of a DSP subroutine for calculating current feedback.

Referring now to FIG. 18, there is shown a DSP subroutine for determining current feedback. The DSP 70 samples and reads the reference currents CURAREF, CURBREF and CURCREF from the buffer 112 (module 602). Then, the DSP 70 sends control signals to the multiplexer 60 over conductor 62 and reads the digital phase currents DCURA, DCURB and DCURC from the A/D converter 68 (module 604). The digital phase currents DCURA, DCURB and DCURC do not reflect the polarity of the current that energizes associated phase winding A, B or C. Therefore, the DSP 70 must determine the polarity of each digital current DCURA, DCURB and DCURC. Because the sample and hold circuits 96, 98 and 100 are synchronized to sample the analog currents ACURA, ACURB and ACURC at the trailing edge of the 50 KHz excitation signal, the polarity of the phase current is positive when the current reference is low (see FIG. 19) and negative when the current reference is high (FIG. 20). The DSP 70 compares each digital current to its corresponding reference current. When the reference current is low and the digital current is high (module 606), the DSP 70 assigns a positive value to the digital current (module 608). When the reference current and the digital current are both high (module 610), the DSP 70 assigns a negative value to the digital current (module 612).

Knowing the polarity of the currents, the DSP 70 can check for motor unbalance. Motor unbalance can be caused by changes in temperature, which affect the impedance of the windings A, B and C. Unbalance can also be caused if a winding A, B or C is shorted to the chassis. To check for motor unbalance, the DSP 70 sums the currents (module 614). If the sum is not approximately equal to zero (module 616), the DSP 70 sets an error flag indicating that the motor is unbalanced (module 618).

Finally, the DSP 70 uses the digital position signals DPOSB, DPOSC and DPOPSA to select a reference current DCURA, DCURB or DCURC, which selection is used as the feedback current (module 620). The selection is made according to the table shown in FIG. 21. For example, when position state S1 is detected for a clockwise rotation, the windings A and C are energized by commutation signals A+ and C−, respectively. Thus, the DSP 70 examines the current flowing out of the winding C and into the DC link return 38. If the current reference CURCREF for the winding C is high, the DSP 70 selects the positive absolute value of the digital current DCURC as the feedback current. The positive polarity indicates that the current ACURC is flowing in a positive direction. If, however, the current reference CURCREF is low, the DSP 70 selects the negative absolute value of the digital current DCURC. The negative polarity indicates that the current ACURC is flowing in a negative direction.

Referring now to FIGS. 22 and 23, there is shown a flowchart of a DSP program for closed loop control of the motor 14. When the DMC 10 is turned on, the DSP 70 loads the program from memory 71, and begins to execute it (module 700). The DSP 70 enables an interrupt, which occurs every twenty microseconds (module 702). During each interrupt, the DSP 70 vectors to the interrupt routine (see FIG. 6). Then, the DSP 70 reads the digital position command POSCMD and services the current, speed and position loops.

The DSP 70 reads the digital position command POSCMD off the data bus 18 (module 704). The digital position command POSCMD can have a maximum value of, for example, 360,000. Thus, a value of "0" would indicate the zero position of the rotor, and a value of "1" would correspond to one-one thousandth of a degree of rotation from the zero position. These exemplary values merely demonstrate the precision allowed by the present invention. Alternately, an analog position command can supplied to the DMC 10. The DMC 10 would simply convert the analog command into a digital signal. Further, these analog signals can be used as alternatives to the signals provided by the position and current sensors 16 and 20. The DSP 70 can be programmed to limit the position command POSCMD between maximum and minimum values. For example, if the DMC 10 controls the operation of a valve, which is closed at zero degrees and open at ninety degrees, the DSP 70 would limit the minimum and maximum values between zero and ninety degrees, respectively. The maximum and minimum values could be stored in memory 71.

When position feedback is made available by the interrupt routine (module 706), the DSP 70 closes the position loop. In module 708, the DSP 70 takes the difference of the position feedback and the position command POSCMD to derive a position error signal that indicates the direction of rotation and the position to which the rotor should be rotated. The polarity of the position error signal can be supplied to the commutation logic cell 72 as the direction command DIRCMD. The position error signal is regulated such that inconsequential deviations close to the zero output state are eliminated. Then, the position error signal is converted to a speed command SPDCMD. For example, the speed could be linearly proportional to the position error signal. In modules 710–716, the speed command SPDCMD is limited between upper and lower limits UP_LIM and LOW_LIM, thereby preventing damage to the motor 14 and drive components due to overspeed.

When speed feedback is made available by the interrupt routine and the speed command SPDCMD is provided by the position loop (module 718), the DSP 70 closes the speed loop. The DSP 70 takes the difference of the speed command SPDCMD and the speed feedback signal to derive a speed error signal, which is regulated and converted to a current command ICMD (module 720). The current command ICMD is limited between upper and lower limits I_UP_LIM and I_LOW_LIM, thereby preventing motor overcurrent or undercurrent (modules 722-728).

When the current feedback is made available by the interrupt routine and when the current command ICMD is made available by the speed loop (module 730), the DSP 70 closes the current loop. The DSP 70 takes the difference of the current command ICMD and the current feedback to derive a current error signal, which is regulated and converted to a commanded duty cycle VOUT (module 732). The commanded duty cycle VOUT is limited by upper and lower limits UPPER_LIM and LOWER_LIM (modules 734-740). The DSP 70 also performs interval EPS adjustment to prevent complementary switches from turning on at the same time (module 742). Changes in temperature affect currents flowing through the windings A, B and C. Increases in current indicated by the DC Link current DCURDC and the current feedback cause the transistors in the inverter 12 to take longer times to discharge. Therefore, the DSP 70 lengthens the interval EPS to allow the transistors time to discharge before the complimentary transistors are turned on. By automatically lengthening the interval EPS, the DSP 70 prevents shoot-through from occurring. Next, if necessary, the DSP 70 readjusts the upper and lower limits for speed, current and duty cycle, respectively (module 744). Temperature sensors are provided in the inverter 12 to indicate the temperature of the motor 14. The DSP 70 monitors the temperatures provided by the temperature sensors. In the event of overtemperature, the DSP 70 can lower the upper limits UP_LIM, I_UP_LIM and UPPER_LIM. For example, when the inverter 12 gets hot, the DSP 70 lowers the upper limit I_UP_LIM from fifty amps to thirty amps. Unlike prior art system, the DMC 10 can adjust its limits without being shut down. In this manner, the DMC 10 is a self-adjusting controller. The DSP 70 combines the commanded duty cycle and interval EPS into the duty cycle command DCCMD, which is sent to the commutation cell logic 72 over data bus 82 (module 746). Then, the DSP 70 reads a new digital position command POSCMD (module 704).

It should be noted, however, that any one of these loops can be bypassed. For instance, the position loop can be bypassed by supplying external commands for direction and speed. The DSP 70 would supply the speed command directly to the speed loop and the direction command directly to the commutation logic cell 72. Alternately, the position and speed loops can be bypassed by supplying a current command and a direction command directly to the DSP 70. The DSP 70 would supply the current command directly to the current loop and the direction command directly to the commutation logic cell 72.

The digital motor controller 10 can be adapted to control motors of any size. For large motors, the DC link high requires a high operating potential. Normally, the current provided by the commutation logic 72 would not be sufficient to turn on the transistors that comprise the upper set of switches 24, 26 and 28 in the inverter 12. Therefore, the inverter 12 is provided with gate drivers, which allow low currents to turn on these transistors. The inputs of the gate drivers are supplied with commutation signals A+, B+ and C+, and the outputs of the gate drivers are coupled to the bases of the respective transistors that comprise the upper switches 24, 26 and 28. As a result, the commutation signals A+, B+ and C+ can turn on their associated transistors.

Thus disclosed is a multi-loop controller that can be adapted for a wide range of servo applications. The DMC 10 provides protection for motor and circuits related to overspeed, overcurrent, overtemperature and position sensor failure. By adjusting the limits of speed, current and duty cycle and the interval EPS for changes in temperature, the DMC 10 is a self-adjusting controller that provides optimal control.

Further, the DMC 10 is a four quadrant positioning controller that offers smooth transition from one quadrant to another, from brake to drive. Resulting is smooth control of the motor 14 for loads that are opposing as well as aiding. The braking results in greater dynamic stiffness of the rotor, i.e., greater ability to hold the rotor in place.

Still further, the DMC 10 offers an advantageous method of measuring speed. Prior art speed converters must wait for a zero-crossing of a position signal to determine speed. In the present invention, however, speed can be determined over a single sampling period (e.g., twenty microseconds). As a result, the DMC 10 can measure low speeds faster and with less ripple than the prior art speed converters.

Still further, multiple DMCS 10 can operate in parallel to share a load. For parallel operation, both static and dynamic load sharing must occur between the multiple DMCS 10 such that force fight is minimized. A buck-boost regulator is employed in the position loop such that both DMCS 10 issue identical speed commands. Further, a buck-boost regulator is employed in the speed loop such that both DMCS 10 issue identical current commands. In this manner, two or more DMCS 10 will be perfectly linear and can operate in parallel without force fight. Buck-boost regulators are well known to those skilled in the art.

Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

I claim:

1. Apparatus for controlling a brushless motor having a rotor, stator windings and sensing means for providing analog position signals indicative of the position of said rotor with respect to said stator windings, comprising:

digitizing means, responsive to said sensing means, for digitizing said analog position signals;

digital signal processing means for selecting said windings to be energized, said digital signal processing means is responsive to said digitizing means, for processing said digitized signals into digital position signals;

commutation means, responsive to said digital position signals, for generating commutation commands;

inverter means, responsive to said commutation commands, for energizing the windings selected by said digital signal processing means;

direction command means for providing direction commands that command direction of motor rotation; and wherein said driving means includes first drive means for providing a first set of commutation commands that cause said rotor to be driven in a first direction, second drive means for providing a second set of commutation commands that cause said rotor to be driven in a second direction, and first selecting means, responsive to said direction command, for selecting either said first set or said second set of commutation commands to be provided on said outputs of said digital signal processing means; and wherein said digital signal processor means further provides a drive command that commands asia motor to either drive or brake; wherein said braking means includes first brake means for providing a third set of commutation commands that cause said rotor to bake while said rotor is rotating in said first direction, and second brake means for providing a fourth set of commutation commands that cause said rotor to brake while said rotor is rotating in said second direction; and wherein said first selecting means is also responsive to said drive command, said first selecting means selecting either said first, second, third or fourth sets of commutation commands to be provided to said inverter means.

2. Apparatus according to claim 1, wherein said digitizing means includes:
sampling means, responsive to said position sensors, for sampling said analog position signals; and
converting means, responsive to said sampling means, for converting said sampled analog position signals to said digitized signals.

3. Apparatus according to claim 2, wherein said sampling means samples said analog position signals at times selected by said digital signal processor means.

4. Apparatus according to claim 1, wherein said braking means further includes actuatable dissipating means, coupled to a DC link high of said inverter means and responsive to said drive commands, for dissipating said power removed from said motor.

5. Apparatus according to claim 1, wherein a first terminal of each winding is connected in common, wherein said inverter means has upper and lower switching means for each winding, each said upper switching means being coupled between a second terminal of said associated winding and a DC link high, said lower switching means being coupled between said second terminal of said associated winding and a DC link return, said upper and lower switching means being conductive in responsive to said commutation commands supplied by said commutation means, wherein said commutation means sends commutation commands to one of said upper switches and one of said lower switches when driving said motor, and wherein said commutation means sends said commutation commands to at least two of said lower switches when braking said motor.

6. Apparatus according to claim 5, wherein said commutation commands pulse width modulate said switching means; wherein each one of said switching means has an inherent capacitance; and wherein said digital signal processor means further includes interval means, responsive to said DC link high, for reducing the conducting time of said switching means such that upper and lower switching means associated with the same windings do not conduct at the same time.

7. Apparatus according to claim 6, wherein said interval means reduces said conducting time of said upper and lower switching means by an interval; and wherein said digital signal processor means further includes comparing means, responsive to said DC link high, for indicating when a current provided by said DC link high exceeds a threshold, and changing means, responsive to said comparing means, for changing said interval.

8. Apparatus according to claim 1, wherein said digital signal processor means includes current control means for controlling the current flowing through said windings.

9. Apparatus according to claim 8, further including current sensor means for indicating the currents flowing through said windings; and wherein said digital signal processor means further includes current feedback means, responsive to said current sensor means, for determining current feedback.

10. Apparatus according to claim 9, wherein said current sensor means includes at least one current sensor for each winding, each said current sensor functioning to measure the current flowing through said associated winding; and wherein said current feedback means includes polarity means, responsive to said current sensors, for adding polarities to said currents measured by said current sensors, and selecting means, responsive to outputs of said polarity means, for selecting a current measured by one of said current sensors as said feedback current.

11. Apparatus according to claim 10, wherein said selecting means is also responsive to said digital position signals.

12. Apparatus according to claim 10, wherein said current feedback means further includes unbalance means for detecting current unbalance in said windings, said unbalance means summing said currents provided by said polarity means, and comparing the summed current to a value indicating whether motor unbalance has occurred.

13. Apparatus according to claim 9, wherein said digital processor means further includes closed loop current means, responsive to a current command and said current feedback, for providing closed loop current control of said motor.

14. Apparatus according to claim 13, wherein said closed loop current means generates a duty cycle command, and wherein said digital signal processor means further includes voltage-limiting means, responsive to said closed loop current means, for limiting said duty cycle command between upper and lower voltage limits.

15. Apparatus according to claim 14, wherein said inverter means further includes temperature sensor means, responsive to said windings, for indicating the temperature of said motor; and wherein said command means further includes adjusting means, responsive to outputs of said temperature sensor means, for adjusting said upper and lower voltage limits in response to variations in said temperature of said motor.

16. Apparatus for controlling a brushless motor having a rotor, stator windings and sensing means for providing analog position signals indicative of the position of said rotor with respect to said stator windings, comprising:
digitizing means, responsive to said sensing means, for digitizing said analog position signals;
digital signal processing means for selecting said windings to be energized, said digital signal processing means is responsive to said digitizing means, for processing said digitizing signals into digital position signals including a speed feedback means, responsive to said digitizing means, for determining speed feedback of said a motor, commutation means, responsive to said digital position signals, for generating commutation commands; and inverter means, responsive to said commutation commands, for energizing the windings selected by said digital signal processing means whereby said digitized signals from each sensor form envelopes; wherein said speed feedback means includes selecting means, responsive to said digital position signals, for selecting an envelope having a non-zero slope; difference means, responsive to said selecting means, for taking difference of successive digitized signals from said selected envelope; and dividing means, responsive to said difference means, for dividing said difference by a sampling time, an output of said dividing means providing a signal indicating said speed feedback.

17. Apparatus according to claim 16, wherein said digital signal processor means further includes closed loop speed means, responsive to a speed command and said speed feedback signal, for providing closed loop speed control of said motor.

18. Apparatus according to claim 17, wherein an output of said closed loop speed means provides current commands, and wherein said digital signal processor means further includes current-limiting means, responsive to said closed loop speed means, for limiting said current commands between upper and lower current limits, and means for controlling said motor to said limited current commands.

19. Apparatus according to claim 18, wherein said inverter means further includes temperature sensor means for indicating the temperature of said motor; and wherein said digital signal processor means further includes adjusting means, responsive to output of said temperature sensor means, for adjusting said upper and lower current limits in response to variations in said temperature of said motor.

20. Apparatus according to claim 17, wherein said digital signal processor means further includes position feedback means for determining position of said rotor, wherein said position feedback means includes coarse means, responsive to said digital position signals, for indicating coarse position of said rotor.

21. Apparatus according to claim 20, wherein said position feedback means further includes direction means for indicating the direction of rotation of said motor, said direction means including lookup means, responsive to an output of said coarse position means, for looking up transitions in coarse positions, which transitions indicate direction of rotation.

22. Apparatus according to claim 21, wherein said direction means further includes position sensor failure means, responsive to said lookup means, for indicating a position sensor failure when said transitions in said coarse positions do not correspond to a direction of rotation in said lookup means.

23. Apparatus according to claim 21, wherein said position feedback means further includes fine position means for determining fine position from each said transition, said fine position means including integrating means, responsive to said speed feedback means, for integrating said speed feedback over a time period since said transition occurred; and wherein said position feedback means further includes adding means, responsive to outputs of said direction means, said coarse means and said fine means, for adding together said coarse position and said fine position, an output of said adding means providing said position feedback.

24. Apparatus according to claim 20, wherein said digital signal processor means further includes closed loop position means, responsive to said position feedback and a position command, for providing closed loop position control of said motor, an output of said closed loop position means providing said speed command to said closed loop speed means.

25. Apparatus according to claim 24, wherein said digital signal processor means further includes speed-limiting means, responsive to said closed loop position means, for limiting said speed command between upper and lower speed limits.

26. Apparatus according to claim 25, wherein said inverter means further includes temperature sensor means for indicating the temperature of said motor; and wherein said digital signal processor means further includes adjusting means, responsive to outputs of said temperature sensor means, for adjusting said upper and lower speed limits in response to changes in said temperature of said motor.

27. Apparatus for controlling a motor having a rotor and first, second and third stator windings, comprising:

first, second and third sensing means, responsive to said rotor, for providing analog signals indicating the proximity of said rotor to said first, second and third windings, respectively;

sampling means, responsive to outputs of said first, second and third position sensors, for sampling said analog signals at selected times;

analog to digital converter means, responsive to said sampling means, for converting said sampled analog signals to digitized signals;

digital signal processor means, responsive to said digitized signals, for providing first, second and third position signals, wherein said first position signal goes high when the value sampled from said first sensing means is greater than the value sampled from said second sensing means, said second position signal goes high when the value sampled from said second sensing means is greater than the value sampled from said third sensing means; and said third position signal goes high when the value sampled from said third sensing means is greater than the value sampled from said first sensing means;

commutation means, responsive to said first, second and third position signals, for generating commutation commands; and inverter means, responsive to outputs of said commutation means, for energizing the windings in response to said commutation commands.

28. Apparatus according to claim 27, wherein said digital signal processor means further includes modulating means for providing duty cycle commands, said commutation commands being modulated by said commutation means in response to said duty cycle commands.

29. Apparatus according to claim 28, wherein said inverter means has upper and lower switching means for each winding, each switching means having an inherent capacitance, each said upper switching means being coupled between a terminal of said associated winding and a DC link high, each said lower switching means being coupled between said terminal of said associated winding and a DC link return, said upper and lower switching means being conductive in response to said commutation commands; and wherein said digital signal processor means further includes interval means, responsive to said DC Link high, for reducing the conducting time of said switching means by an interval such that upper and lower switching means associated with the same winding do not conduct at the same time.

30. Apparatus according to claim 29, wherein said digital signal processor means further includes first adjusting means for adjusting said interval in response to variations in said DC link high.

31. Apparatus according to claim 30, wherein said digital signal processor means further includes:
  feedback means for providing feedback signals indicative of motor performance; and
  loop closing means for closing at least one loop between said feedback signals and command supplied to said digital signal processor means; an output of said loop closing means providing said duty cycle commands.

32. Apparatus according to claim 31, further including temperature sensing means for sensing variations in motor temperature; and wherein said loop closing means includes:
  limiting means for limiting error signals provided by said loop closing means between upper and lower limits; and
  adjusting means, responsive to said temperature sensing means, for adjusting said upper and lower limits in response to variations in said motor temperature.

33. A method for controlling a brushless motor having a rotor, a stator, sensor means for providing analog signals indicating the position of said rotor relative to windings of said stator and inverter means for energizing selected stator windings in response to commutation commands, said method comprising the steps of:
  (a) sampling said analog signals;
  (b) digitizing said sampled analog signals;
  (c) generating digital position signals for each winding, said digital position signals being set at a first state when said rotor is closer in proximity to a corresponding winding than the next winding, said digital position signal being set at a second state when rotor is closer in proximity to the next winding than to a corresponding winding;
  (d) decoding said position digital signals into said commutation commands;
  (e) decoding said digital position signals to determine which envelope of a corresponding winding has a non-zero slope;
  (f) taking the difference of successive samples of said winding having the non-zero slope; and
  (g) dividing said difference by sampling time to yield motor speed.

34. A method according to claim 33, further comprising the steps of sensing currents flowing through each winding; decoding said digital position signals to determine which winding is energized; and selecting the sensed current from the energized winding as a feedback current.

35. A method according to claim 34, further comprising the steps of assigning polarities to each sensed current; and summing said currents which were assigned polarities.

36. A method according to claim 33, further including the steps of:
  decoding said digital position signals to determine coarse positions of said rotor; and
  detecting transitions in said coarse positions to indicate motor direction.

37. A method according to claim 36, further including the steps of:
  integrating speed over a interval between a given time and a time at which a transition in states last occurred;
  adding polarity to said integrated speed according to said direction of rotation to yield a delta position; and
  adding said to said delta position to said coarse position.

38. A method according to claim 33, said motor having loop closing means for closing loops between motor command and motor feedback signals, said loop closing means providing at least one error signal, said method further comprising the steps of
  limiting said error signal by at least one limit; and
  adjusting said t least one limit in response to changes in motor temperatures.

* * * * *